United States Patent [19]
Williams

[11] Patent Number: 4,552,912
[45] Date of Patent: * Nov. 12, 1985

[54] FLAME RETARDENT POLYAMIDE COMPOSITIONS

[75] Inventor: Ian G. Williams, Cleveland, England

[73] Assignee: Imperial Chemical Industries PLC, London, England

[ * ] Notice: The portion of the term of this patent subsequent to Oct. 22, 2002 has been disclaimed.

[21] Appl. No.: 584,907

[22] Filed: Feb. 29, 1984

[30] Foreign Application Priority Data

Mar. 17, 1983 [GB] United Kingdom ................. 8307407

[51] Int. Cl.$^4$ .......................... C08L 77/00; C08K 5/34
[52] U.S. Cl. .......................... 524/100; 260/DIG. 24;
524/432; 524/405; 524/411; 524/412; 524/467;
524/427; 524/514; 524/494; 524/508
[58] Field of Search ................. 524/100; 260/DIG. 24

[56] References Cited

FOREIGN PATENT DOCUMENTS 0001322  7/1979  European Pat. Off. .
1572497  7/1980  United Kingdom .

*Primary Examiner*—John Kight
*Assistant Examiner*—M. L. Moore
*Attorney, Agent, or Firm*—Cushman, Darby & Cushman

[57] ABSTRACT

A glass-reinforced, fire-retardant, arc-track resistant polyamide composition characterized in that it contains:
(a) at least 35% by weight of a fibre-forming polyamide,
(b) 15% to 30% by weight of glass fibres or particulate fillers,
(c) 17.5 to 27.5% by weight of melamine or melamine cyanurate,
(d) 1 to 10% by weight of brominated fire retardants selected from a brominated polyphenylene oxide or a brominated epoxy resin, and
(e) a synergist selected from zinc oxide, zinc borate, a mixture of zinc oxide and zinc borate and a mixture of antimony oxide and zinc borate, wherein the concentration of oxide present in the synergist is between 0 and 5%, the concentration of borate present is between 0 and 25% by weight, and the total weight of synergist is at least 1%, the weight percentages of the constituents (a), (b), (c), (d) and (e) totalling 100%.

5 Claims, No Drawings

FLAME RETARDENT POLYAMIDE COMPOSITIONS

This invention relates to glass-reinforced polyamide compositions having a good balance of fire retardancy and resistance to carbonisation when subjected to excessive leakage of electrical current.

British Pat. No. 1 572 497 discloses glass-reinforced polyamide compositions having a good level of both fire retardancy and arc tracking resistance. These compositions contain from 5 to 30% by weight of a halogenated fire retardant. For some uses the corrosivity of the fumes generated on burning the composition is a very important consideration. In these applications compositions should be used which contain as little as possible of halogen-containing constituents. European Patent Application No. 55893 discloses glass-reinforced flame-retardant polyamide compositions in which a mixture of halogenated compounds and melamine derivatives are used in order to reduce the concentration of halogenated compound present. The compositions disclosed contain:

(a) from 40 to 65% by weight of a polyamide, (b) 16 to 35% by weight of melamine, melam, melamine cyanurate or a melamine derivative which has the formula:

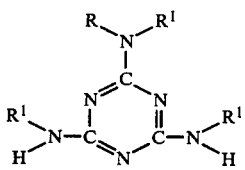

where R and R¹ may be the same or different and hydrogen, lower alkyl, phenyl, tolyl or halophenyl, (c) 1 to 7% by weight of a chlorinated compound obtained from condensation of two moles of perchlorocyclopentadiene and one mole of 1,5-cyclooctadiene or a brominated polystyrene (d) 1 to 4.9% by weight of zinc borate or zinc oxide, and (e) 5 to 30% by weight of glass fibres.

It has now been found that a good balance of fire retardancy and arc tracking resistance can be achieved with alternative halogenated compounds.

Accordingly there is provided a glass-reinforced, fire-retardant, arc-track resistant polyamide composition characterised in that it contains:

(a) at least 35% by weight of a fibre-forming polyamide, (b) 15 to 30% by weight of glass fibres or particulate fillers, (c) 16 to 30%, preferably 17.5 to 27.5% by weight of melamine or melamine cyanurate, (d) 1 to 10% by weight of brominated fire retardants selected from a brominated polyphenylene oxide or a brominated epoxy resin, and (e) a synergist selected from zinc oxide, zinc borate, a mixture of zinc oxide and zinc borate and a mixture of antimony oxide and zinc borate, wherein the concentration of oxide present in the synergist is between 0 and 5%, the concentration of borate present is between 0 and 25%, preferably between 2 and 15% by weight, and the total weight of synergist is at least 1%, the weight percentages of the constituents (a), (b), (c), (d) and (e) totalling 100%.

When zinc oxide is used as the sole synergist the weight ratio of constituent (d) to zinc oxide should be at least 1:1 and preferably at least 2:1.

The fire retardancy behaviour of the compositions of the invention is very specific to the particular combinations of ingredients and cannot be predicted from European Patent Application No. 55893.

The fire-retardant characteristics of the composition of the invention are conveniently determined using the Underwriters Laboratories Test Standard UL94. Using the Vertical Burning Test of this Standard the compositions of the invention should have a rating of 94 V1 or better when tested on samples having a thickness of 1.6 mm both when conditioned at a relative humidity of 50% for 48 hours or at 70° C. for one week.

The tracking resistance of the compositions is conveniently determined by the method set out in the method of DIN 53480/1972 (KC Method). The compositions when tested according to this method should have a comparative tracking resistance of at least 300, preferably at least 375, and more desirably at least 500, that is having a tracking resistance in the specified test of at least 300 volts and preferably at least 375 volts and more desirably at least 500 volts.

The polyamides used in the invention are polyamides having a melting point above 220° C., preferably containing a major proportion of repeating units derived from hexamethylene adipamide, hexamethylene sebacamide or caprolactam. The most suitable polymers are homopolymers of nylon 66 and nylon 6 and copolymers of these materials containing not more than 50% by weight of units other than nylon 66 or nylon 6. These other units may be, for example, of nylon 6.9 or 6.10. The preferred materials are the homopolymers of nylon 66 and nylon 6 and copolymers of nylon 66 with nylon 6.

The polyamides preferably have a number average molecular weight of at least 3000.

The brominated polyphenylene oxide and brominated epoxy resin should have a bromine content of at least 30% by weight. Particularly suitable brominated epoxy resins are prepared by the condensation of propylene oxide and tetrabromobisphenol A. A preferred resin contains propylene oxide and tetrabromobisphenol A in the molar ratio of 3:2.

The melamine cyanurate may be added to the composition as preformed melamine cyanurate or alternatively may be formed during the compounding stage by including appropriate quantities of cyanuric acid and melamine in the composition.

The synergist may be selected from zinc borate, zinc oxide, mixtures of antimony oxide and zinc borate and mixtures of zinc oxide and zinc borate. When an oxide is present relatively little oxide is required to give good fire retardancy. When the oxide exceeds a concentration of 5% by weight the electrical properties of the composition are deleteriously affected. The concentration of oxide present should therefore be in the range 0.05 to 5.0% by weight. When zinc borate is included much higher levels can be tolerated without adversely affecting electrical properties. The preferred levels of zinc borate are between 2 and 15% by weight.

The zinc borate should be thermally stable at the processing temperatures of the polyamide so that it does not evolve significant amounts of volatile material when used at the processing temperature of the polyamide.

This requirement is important because materials which give such volatile products can give rise to processing difficulties particularly when the composition is extruded as a lace. The preferred form of zinc borate is of the form $2ZnO.3B_2O_3.xH_2O$, where x is between 3.3 and 3.7. This material does not lose appreciable amounts of water below 300° C. The preparation of such compounds is described in British Patent Specification No. 1 184 967. The higher hydrates for example $2ZnO.3B_2O_3.7H_2O$ and $2ZnO.3B_2O_3.9H_2O$ lose water below the processing temperatures of most polyamides and are therefore unsuitable except for use with low melting point polyamides because they are difficult to blend with polyamides such as nylon 66 and nylon 6 and would present problems during melt fabrication into shaped articles. Anhydrous zinc borate may be used but the results obtained are generally inferior to those obtained using the hydrated form $2ZnO.3B_2O_3.xH_2O$ where x is between 3.3 and 3.7, particularly $2ZnO.3B_2O_3.3.5H_2O$.

The compositions may be produced by intimately blending the glass fibres and fire retardant additives in the presence of molten polyamide. Suitably, the compounding can be carried out in a screw extruder.

The glass fibres used are preferably commercially available glass fibres coated with size compositions which maximise the mechanical properties of glass reinforced polyamide compositions. These sizes will normally include a silane coupling agent.

The particulate fillers used in the invention include any of the known mineral fillers such as talc, clay, limestone, kaolin, wollastinite and mica. These may be treated with silane coupling agents to improve bonding between the filler and polyamide.

Mixtures of glass fibres and particulate fillers may be used.

In addition to the polyamide and the specified ingredients the compositions of the invention may contain any of the auxiliary materials which are known for use in polyamide compositions. These include heat and light stabilisers, pigments, lubricants and mould release agents.

The compositions of the invention are suitable for moulding general purpose electrical components or other components where fire retardancy is important.

The invention is further illustrated by reference to the following examples.

EXAMPLE 1

The compositions listed in Table 1 were prepared by dry blending the ingredients of each composition with polyamide granules of 90:10 nylon 66:nylon 6 copolymer prior to feeding them to a 50.8 mm single screw extruder, filled with by-pass venting, maintained at a temperature between 250 and 270° C. The melt compounded mixture was extruded as a lace, quenched in a water bath and cut into granules. After drying, the products were injection moulded into test pieces for fire retardancy, electrical and mechanical property measurements. These properties are listed in Table 1 in which the concentrations of all ingredients are expressed as percent by weight of the total composition.

TABLE 1

| Composition | Glass fibre | Melamine | Fire Retardant | Synergist | Fire retardancy performance (sec) 50% RH/ 48 hours max | mean | 70° C./1 week max | mean | UL94 rating | Kc (volts) | Tensile strength $MN/m^2$ | Impact strength (kJ) UNIS | IS ¼ | Limiting oxygen index |
|---|---|---|---|---|---|---|---|---|---|---|---|---|---|---|
| 1 | 20 | 25 | 4 | BE[1] 1 ZnO | 7 | 1.5 | 5 | 1.9 | V0 | 425 | 92 | 16 | 3.7 | — |
| 2 | 20 | 25 | 4 | BE 3 ZB[3] | 6 | 3.3 | 4 | 2.2 | V0 | 300 | 126 | 31 | 4.5 | — |
| 3 | 20 | 25 | 4 | BE 1 AO[4] + 3 ZB | 0 | 0 | 2 | 0.4 | V0 | 350 | 107 | 25 | 5.1 | — |
| 4 | 20 | 25 | 4 | BE 1 ZnO + 3 ZB | 13 | 2.4 | 7 | 3.4 | V1 | 425 | 99 | 19 | 3.5 | — |
| 5 | 20 | 25 | 2.5 | BE 0.8 AO + 3 ZB | 3 | 1.5 | 3 | 2.0 | V0 | 425 | 107 | 24 | 4.8 | 30.4 |
| 6 | 20 | 25 | 2.5 | BE 0.5 AO + 6 ZB | 1.0 | 0.5 | 2 | 0.4 | V0 | 375 | 106 | 21 | 4.6 | 31.6 |
| 7 | 20 | 22.5 | 2.25 | BE 0.7 AO + 2.7 ZB | 12 | 4.2 | 8 | 2.7 | V1 | — | — | — | — | — |
| 8 | 18 | 25 | 2.5 | BE 0.8 AO + 3 ZB | 4 | 1.5 | 2 | 1.2 | V0 | — | — | — | — | — |
| 9 | 22 | 22.5 | 2.25 | BE 0.7 AO + 2.7 ZB | 5 | 2.4 | 9 | 2.9 | V0 | 400 | 115 | — | — | — |
| 10 | 22 | 22.5 | 2.25 | BE 0.7 AO + 5.4 ZB | 3 | 1.5 | 7 | 1.9 | V0 | 400 | 115 | — | — | — |
| 11 | 20 | 25 | 4 | BP[2] 1 AO + 3 ZB | 4 | 1.4 | 2 | 0.5 | V0 | 325 | 102 | 22 | 4.7 | — |
| 12 | 20 | 25 | 2 | BP 0.5 AO + 6 ZB | 4 | 1.8 | 9 | 3.3 | V0 | 350 | — | — | — | — |
| 13 | 20 talc | 25 | 2.5 | BE 0.8 AO + 6 ZB | 11 | 4.1 | — | — | V1 | — | — | — | — | — |
| 14 | 20 clay | 25 | 2.5 | BE 0.8 AO + 6 ZB | 1 | 0.5 | — | — | V0 | — | — | — | — | — |
| 15 | 20 Limestone | 25 | 2.5 | BE 0.8 AO + 6 ZB | 2 | 0.7 | — | — | V0 | — | — | — | — | — |
| 16 | 20 talc | 25 | 2.5 | BP 0.8 AO + 6 ZB | 5 | 1.2 | 3 | 1.6 | V0 | — | — | — | — | — |
| 17 | 20 Glass fibre | 12.5 melamine 12.5 cyanuric acid | 4 | BE 1 AO + 3 ZB | 25 | 13.3 | 28 | 7.8 | V1 | — | — | — | — | — |

[1] BE is a brominated epoxy resin of propylene oxide condensed with tetrabromobisphenol A containing 48% by weight of bromine.
[2] BP is a brominate polyphenylene oxide containing about 64% by weight of bromine.
[3] ZB is zinc borate of formula $2ZnO.3B_2O_3.3.5H_2O$.
[4] AO is antimony oxide.

COMPARATIVE EXAMPLE

The compositions listed in Table 2 were prepared according to the procedure of Example 1. The fire retardancy of these compositions is included in Table 2.

These results show that inadequate fire retardancy is obtained using compositions which differ from those according to the invention.

TABLE 2

| Composition | Glass fibre | Melamine | Fire Retardant | Synergist | Fire retardancy performance (sec) | | | | UL94 rating | Limiting oxygen index |
|---|---|---|---|---|---|---|---|---|---|---|
| | | | | | 50% RH/48 hours | | 70° C./1 week | | | |
| | | | | | max | mean | max | mean | | |
| A | 20 | 25 | 4 BE | 1 AO | 9 BD | 1.1 | — | — | V2 | 28.8 |
| B | 20 | 15 | 4 BE | 1 AO + 3 ZB | 35 | 16.3 | 50 BD | 15.6 | V2 fail | — |

I claim:

1. A glass-reinforced, fire-retardant, arc-track resistant polyamide composition characterised in that it contains:
   (a) at least 35% by weight of a fibre-forming polyamide,
   (b) 15 to 30% by weight of glass fibres or particulate fillers,
   (c) 16 to 30% by weight of melamine or melamine cyanurate,
   (d) 1 to 10% by weight of brominated fire retardants selected from a brominated polyphenylene oxide or a brominated epoxy resin, and
   (e) a synergist selected from zinc oxide, zinc borate, a mixture of zinc oxide and zinc borate and a mixture of antimony oxide and zinc borate, wherein the concentration of oxide present in the synergist is between 0 and 5%, the concentration of borate present is between 0 and 25% by weight, and the total weight of synergist is at least 1%, the weight percentages of the constituents (a), (b), (c), (d) and (e) totalling 100%.

2. A glass reinforced, fire retardant, arc-track resistant polyamide composition according to claim 1 wherein the concentration of melamine or melamine cyanurate is between 17.5 and 27.5%.

3. A glass reinforced, fire retardant, arc-track resistant polyamide composition according to either of claims 1 or 2 wherein the concentration of oxide present in the synergist (e) is between 0.05 and 5% by weight of the total composition.

4. A glass reinforced, fire retardant, arc-track resistant polyamide composition according to any one of claims 1 to 3 wherein the concentration of zinc borate present in the synergist (e) is between 2 and 15% by weight of the total composition.

5. A glass reinforced, fire retardant, arc-track resistant polyamide composition according to any one of claims 1 to 4 wherein the weight ratio of fire retardant (d) to synergist (e) is at least 1:1 when the synergist is solely zinc oxide.

* * * * *